United States Patent
Hong et al.

(10) Patent No.: US 9,483,131 B2
(45) Date of Patent: Nov. 1, 2016

(54) LIQUID CRYSTAL DISPLAY AND METHOD OF DRIVING THE SAME

(71) Applicant: LG Display Co., Ltd., Seoul (KR)

(72) Inventors: Jin Cheol Hong, Paju-si (KR); Pil Sung Kang, Paju-si (KR); Man Gyu Park, Paju-si (KR); Seung Cheol Oh, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 162 days.

(21) Appl. No.: 13/707,324

(22) Filed: Dec. 6, 2012

(65) Prior Publication Data

US 2013/0285998 A1    Oct. 31, 2013

(30) Foreign Application Priority Data

Apr. 30, 2012    (KR) .......................... 10-2012-0045186

(51) Int. Cl.
   *G06F 3/038*    (2013.01)
   *G09G 3/36*    (2006.01)

(52) U.S. Cl.
   CPC ................. *G06F 3/038* (2013.01); *G09G 3/36* (2013.01); *G09G 3/3688* (2013.01); *G09G 2310/08* (2013.01)

(58) Field of Classification Search
   CPC ........... G09G 3/3688; G09G 2310/08; G09G 3/038; G09G 3/36
   See application file for complete search history.

(56) References Cited

U.S. PATENT DOCUMENTS

| | | | |
|---|---|---|---|
| 6,232,945 B1 * | 5/2001 | Moriyama | G09G 3/3648 345/100 |
| 6,333,730 B1 | 12/2001 | Lee | |
| 6,397,374 B1 * | 5/2002 | Pasqualini | 326/49 |
| 7,193,601 B2 * | 3/2007 | Furuya | G09G 3/3677 345/100 |
| 8,325,122 B2 | 12/2012 | So | |
| 8,872,748 B2 * | 10/2014 | Cho | G09G 3/3677 345/100 |
| 2002/0023253 A1 | 2/2002 | Pasqualini | |
| 2005/0062734 A1 * | 3/2005 | Morita | G09G 3/3648 345/204 |
| 2005/0259058 A1 * | 11/2005 | Yamaguchi et al. | 345/87 |
| 2007/0046613 A1 | 3/2007 | Ha et al. | |
| 2007/0052568 A1 | 3/2007 | Horibata | |
| 2007/0052651 A1 | 3/2007 | Kim et al. | |
| 2007/0109282 A1 * | 5/2007 | Kida | G09G 3/3688 345/204 |

(Continued)

FOREIGN PATENT DOCUMENTS

| | | |
|---|---|---|
| CN | 101763831 A | 6/2010 |
| DE | 19809221 A1 | 9/1998 |

(Continued)

OTHER PUBLICATIONS

Chinese First Office Action, Chinese Application No. 201210465203.9, Jan. 12, 2015, 20 pages.

*Primary Examiner* — Ilana Spar
*Assistant Examiner* — Mihir K Rayan
(74) *Attorney, Agent, or Firm* — Fenwick & West LLP (57) ABSTRACT

An LCD device and a method of driving the same are provided. The LCD device includes a panel, one or more gate driver IC, a timing controller, and a source driver IC. The gate driver IC sequentially drives a plurality of gate lines formed in the panel. The timing controller controls the gate driver IC. The source driver IC simultaneously transfers image data from a first latch to a second latch according to a latch signal, converts the image data transferred from the second latch into data voltages, and outputs the data voltages to the panel at a falling time of a source output enable signal.

13 Claims, 9 Drawing Sheets

(56) References Cited

U.S. PATENT DOCUMENTS

| | | |
|---|---|---|
| 2008/0129903 A1* | 6/2008 | Hong .................. G09G 3/3648 349/36 |
| 2008/0158266 A1 | 7/2008 | So |
| 2008/0158424 A1 | 7/2008 | Park et al. |
| 2008/0170027 A1 | 7/2008 | Kyeong et al. |
| 2009/0167750 A1* | 7/2009 | Hong et al. .................. 345/213 |
| 2010/0149083 A1 | 6/2010 | Park et al. |
| 2010/0225637 A1 | 9/2010 | Jeon et al. |
| 2012/0098813 A1 | 4/2012 | Park et al. |
| 2012/0133577 A1 | 5/2012 | Gondo |

FOREIGN PATENT DOCUMENTS

| | | |
|---|---|---|
| DE | 102009037651 A1 | 6/2010 |
| JP | 2001-337637 A | 12/2001 |
| JP | 2007-053459 A | 3/2007 |
| JP | 2007-058177 A | 3/2007 |
| JP | 2007-072440 A | 3/2007 |
| JP | 2008-165238 A | 7/2008 |
| JP | 2011-232780 A | 11/2011 |
| JP | 2012-008519 A | 1/2012 |
| KR | 1999-0063416 A | 7/1999 |
| KR | 2008-0062669 A | 7/2008 |

* cited by examiner

LIQUID CRYSTAL DISPLAY AND METHOD OF DRIVING THE SAME

CROSS-REFERENCE TO RELATED APPLICATIONS

This application claims the benefit of the Korean Patent Application No. 10-2012-0045186 filed on Apr. 30, 2012, which is hereby incorporated by reference as if fully set forth herein.

BACKGROUND

1. Field of the Invention

The present invention relates to a liquid crystal display (LCD) device, and more particularly, to an LCD device and a method of driving the same, which can prevent vertical line noise from occurring due to a power ripple between a high-level voltage (VDD) and a low-level voltage (VSS) at a time for which a source driver IC charges/discharges a panel load.

2. Discussion of the Related Art

Generally, LCD devices adjust the light transmittance of liquid crystal with an electric field to display an image. To this end, the LCD devices include a panel in which a plurality of pixels are arranged in a matrix type, and a driving circuit for driving the panel.

In the panel, a plurality of gate lines and data lines are arranged to intersect, and the plurality of pixels are respectively formed in a plurality of areas prepared by respective intersection between the gate lines and the data lines.

The driving circuit includes a gate driver IC for driving the gate lines, a data driver IC for driving the data lines, and a timing controller for controlling the gate driver IC and the data driver IC. The gate driver IC sequentially supplies a scan signal (gate signal) to the gate lines, and thus sequentially drives the pixels of the panel in units of one line. The source driver IC supplies a plurality of pixel voltage signals to the respective data lines each time the gate signal is supplied to any one of the gate lines. The LCD devices may include at least one or more source driver ICs and at least one or more gate driver ICs.

Figure 1A:
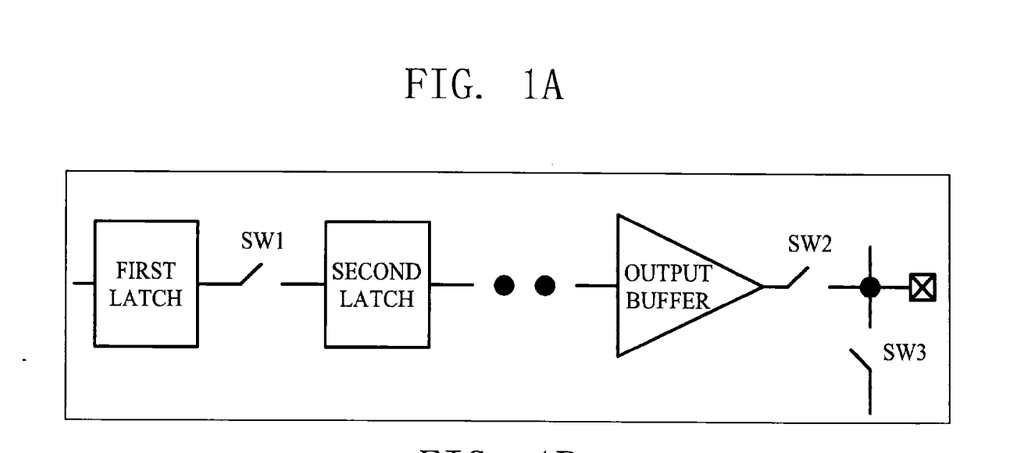
FIGS. 1A and 1B are exemplary diagrams for describing a configuration and operation of a related art source driver IC.
Figure 1B:
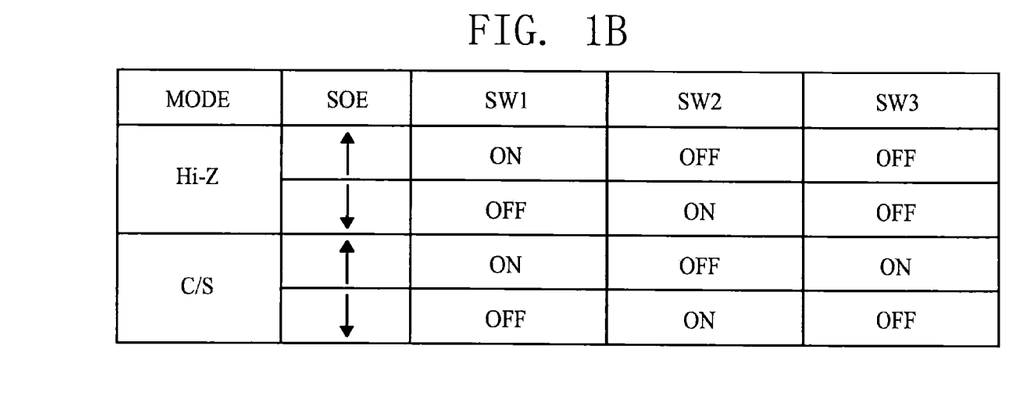
Figure 2:
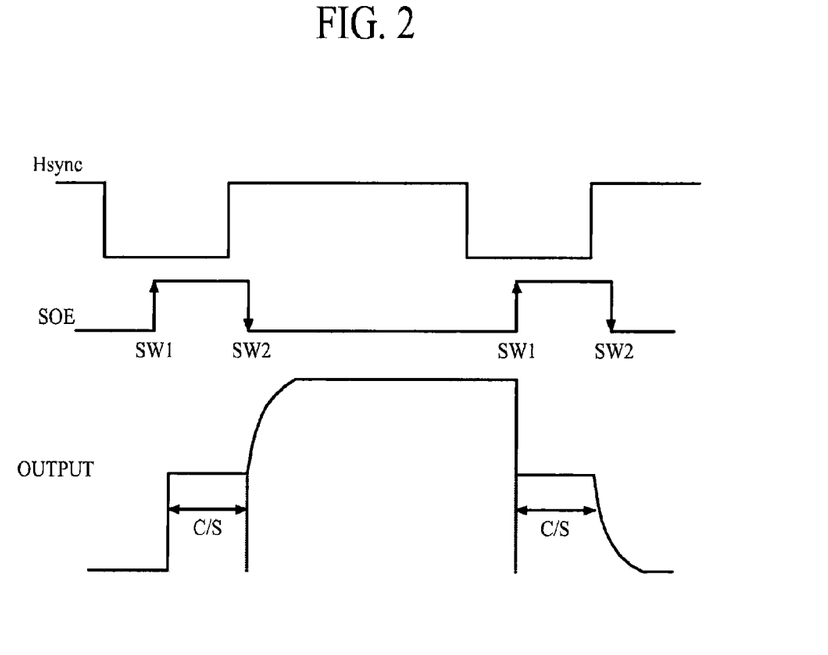
FIG. 2 is a diagram showing waveforms of various signals in the related art source driver IC.
Figure 3:
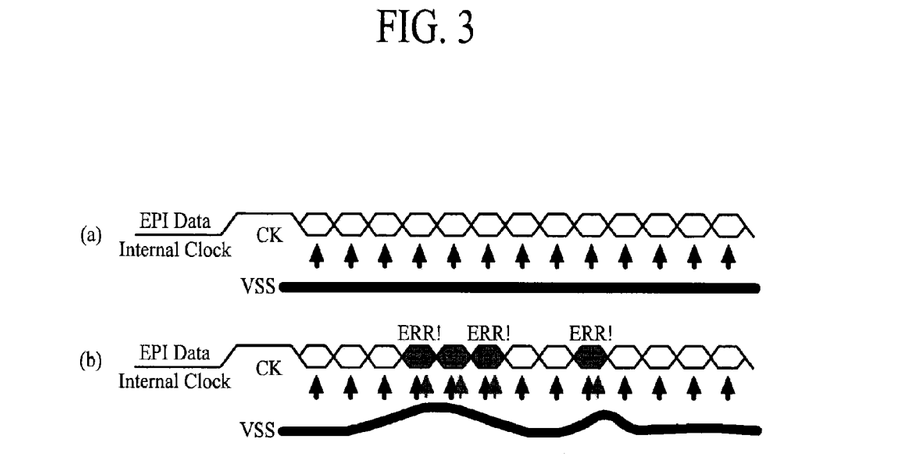
FIG. 3 is an exemplary diagram showing output states of an internal clock and data in the related art source driver IC using an EPI type.

FIGS. 1A and 1B are exemplary diagrams for describing a configuration and operation of a related art source driver IC. FIG. 1A illustrates a connection state between internal elements of the source driver IC, and FIG. 1B is a table for describing the switching operations of the elements of FIG. 1A. In FIG. 1B, a charge/share (C/S) mode is a mode using a charge share voltage. In the C/S mode, when a third switch SW3 is turned on, the panel is charged with the charge share voltage C/S. In FIG. 1B, a Hi-Z mode is a mode using no charge share voltage. In the Hi-Z mode, as shown in FIG. 1B, the third switch SW3 always maintains a turn-off state. Hereinafter, the related art will be described with the C/S mode as an example. FIG. 2 is a diagram showing waveforms of various signals in the related art source driver IC. FIG. 3 is an exemplary diagram showing output states of an internal clock and data in the related art source driver IC using an embedded point-to-point interface (EPI) type.

In the related art source driver IC, as shown in FIGS. 1A through 2, a first latch transfers data to a second latch at a rising time of a source output enable (SOE) signal, and, at a falling time of the SOE signal, the output of the source driver IC charges/discharges a panel load.

Specifically, when the SOE signal rises, a first switch SW1 is turned on, and thus, the first latch transfers data to the second latch, at which point the third switch SW3 is turned on and thus a panel is charged with a charge share voltage C/S. When the SOE signal falls, the first and third switches SW1 and SW3 are turned off and the second switch SW2 is turned on, and thus, image data are outputted from an output buffer (Amp) to the panel.

In a related art LCD devices, as described above, the first switch SW1 is turned on at a rising time of the SOE signal, and the second switch SW2 is turned on at a falling time of the SOE signal. Therefore, as shown in FIG. 2, the first switch SW1 is necessarily turned on after last image data, and thereafter, charge sharing is performed until the second switch SW2 is turned on from after the first switch SW1 is turned on. At a falling time of the SOE signal, when the second switch SW2 is turned on, data voltages are outputted from the source driver IC to the panel.

However, as shown in FIG. 2, an SOE falling time is a time at which the second switch SW2 is turned on and thus the source driver IC drives the panel load, and thus, a power ripple may occur between the high-level voltage VDD and the low-level voltage VSS.

Especially, a source driver IC using a timing controller and an EPI is greatly affected by a power ripple. In the source driver IC using the EPI, a delay lock loop (DLL) (which is included in the source driver IC) for generating an internal clock uses a low voltage. Therefore, as shown in FIG. 3, the above-described power ripple between the high-level voltage and the low-level voltage greatly affects the ground (GND) voltage VSS of a DLL circuit. In the DLL circuit, as shown in FIG. 3, the ripple of the ground (GND) voltage VSS shifts the phase of the internal clock. In this case, due to the shortage of a setup/hold time between data and a clock that are outputted from the source driver IC, noise (vertical line noise) occurs in a vertical line direction of the panel.

Even in a source driver IC using another interface (for example, mini-LVDS or the like) instead of the EPI as an interface between the timing controller and the source driver IC, circuits that are included in the source driver IC and use a low voltage may be affected by the above-described ripple, in which case noise may occur in a vertical line direction of the panel.

Moreover, even in circuits using no low voltage, the internal elements of a source driver IC may be affected by the above-described power ripple, in which case noise may occur in a vertical line direction of the panel.

SUMMARY

Accordingly, the present invention is directed to an LCD device and a method of driving the same that substantially obviate one or more problems due to limitations and disadvantages of the related art.

An aspect of the present invention is directed to provide an LCD device and a method of driving the same, which allow data to be transferred from a first latch to a second latch by using a latch signal that is driven independently from a source output enable (SOE) signal allowing image data to be outputted to a panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a panel; one or more gate driver IC sequentially driving a plurality of gate lines formed in the panel; a timing controller controlling the gate driver IC; and a source driver IC simultaneously transferring image data from a first latch to a second latch according to a latch signal, converting the image data transferred from the second latch into data voltages, and outputting the data voltages to the panel at a falling time of a source output enable signal.

In another aspect of the present invention, there is provided a method of driving an LCD device including: outputting a latch signal during a blank time of a horizontal sync signal to allow image data to be simultaneously transferred from a first latch to a second latch; converting the image data, transferred from the second latch, into data voltages; and performing fall of a source output enable signal after the latch signal is outputted during the blank time, and outputting the data voltages to the panel at the falling time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described with reference to the accompanying drawings.

Figure 4:
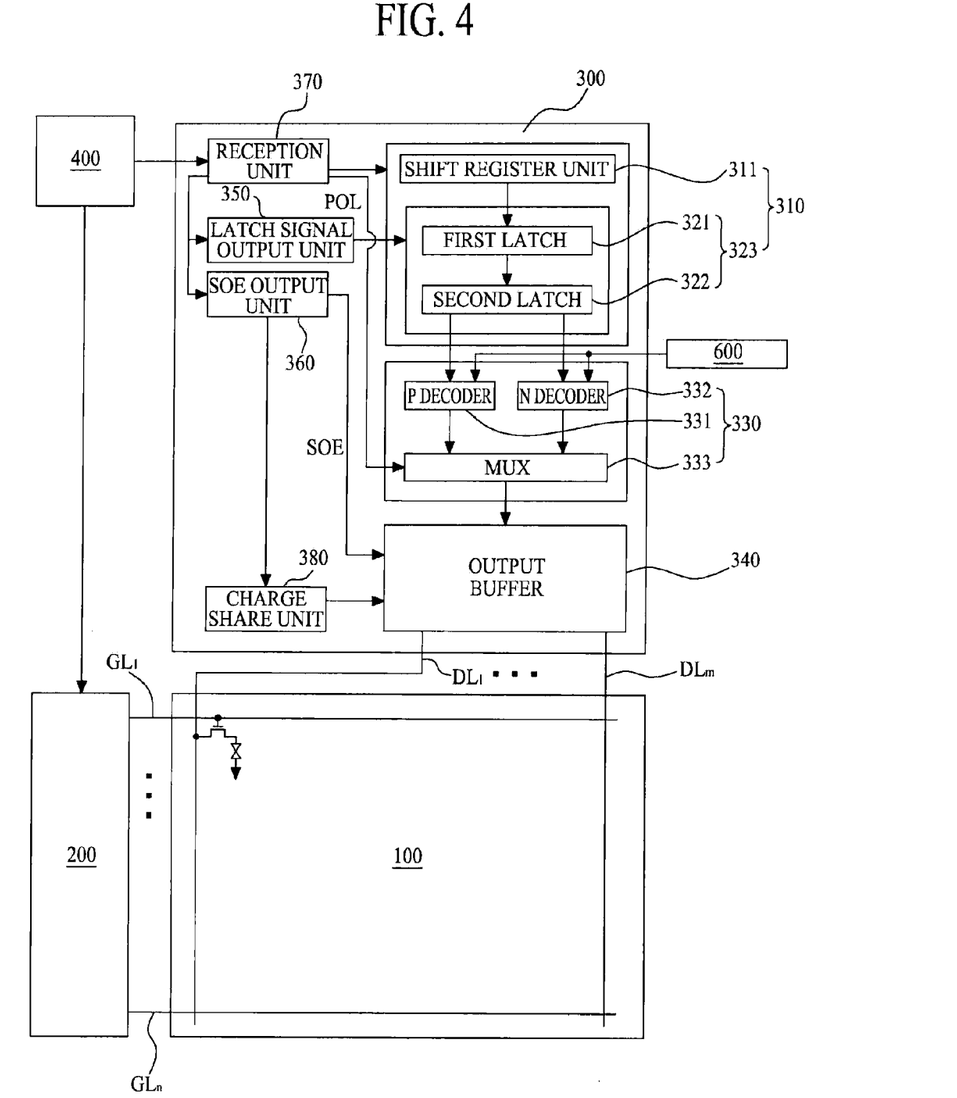
FIG. 4 is an exemplary diagram illustrating a configuration of an LCD device according to an embodiment of the present invention.

FIG. 4 is an exemplary diagram illustrating a configuration of an LCD device according to an embodiment of the present invention.

The LCD device according to an embodiment of the present invention includes: a panel 100 in which a plurality of data lines DL and gate lines GL are formed to intersect, and a plurality of thin film transistors (TFTs) respectively formed in a plurality of pixel areas defined by respective intersections between the data lines DL and the gate lines GL; one or more source driver ICs 300 that supply data voltages to the data lines DL of the panel 100; one or more gate driver ICs 200 that sequentially drive the gate lines GL of the panel 100; a timing controller 400 that controls the source driver ICs 300 and the gate driver ICs 200; and a gamma reference voltage generator 600 that supplies gamma voltages to the source driver ICs 300.

The panel is configured with two glass substrates, and liquid crystal is injected into a gap between the two glass substrates. A plurality of pixels are respectively formed in the plurality of pixel areas defined by respective intersections between the data lines DL and the gate lines GL. The TFT formed in each of the pixels supplies a data voltage, applied from the source driver IC 300, to a pixel electrode formed in a corresponding pixel in response to a scan pulse applied from the gate driver IC 200.

The timing controller 400 receives a driving voltage from an external system such as a personal computer or a television. The timing controller 400 aligns red (R), green (G), and blue (B) input video data that are transmitted from the external system, according to the pixel type of the panel 100, and supplies the aligned image data to the source driver IC 300. The timing controller 400 generates a dot clock Dclk and various control signals SSP, SSC, SOE, REV, POL, GSC, GOE and GSP with a timing signal (including a horizontal sync signal and a vertical sync signal) inputted from the external system, and controls the source driver IC 300 and the gate driver IC 200 with the dot clock and the control signals. Among the various control signals, a common name of control signals for controlling the source driver IC 300 is a data control signal DCS, and a common name of control signals for controlling the gate driver IC 200 is a gate control signal GCS. The dot clock Dclk and the data control signals SSP, SSC, SOE, REV and POL are supplied to the source driver IC 300, and the gate control signals GSP, GSC and SOE are supplied to the gate driver IC 200. The timing controller 400 communicates with the external system through a low voltage differential signal (LVDS) interface or a transistor-transistor logic (TTL) interface to receive the timing signal and input video data.

The gate driver IC 200 includes a shift resister that sequentially generates the scan pulse in response to a gate start pulse (GSP) inputted from the timing controller 400, and a level shifter that shifts the voltage of the scan pulse to a level suitable for driving a liquid crystal cell. However, in a gate-in panel (GIP) type in which the gate driver IC 200 is mounted on the panel 100, the gate driver IC 200 may be driven with gate control signals such as a gate start signal VST and a gate clock GCLK that are generated by the timing controller 400. The gate driver IC 200 may be provided as one or more depending on the size and characteristic of the panel 100.

The gamma reference voltage generator 600 generates a gamma reference voltage and supplies the gamma reference voltage to the source driver IC 300. The source driver IC 300 converts image data into analog data voltages with the gamma reference voltage, and outputs the data voltages to the panel 100.

The source driver IC 300 transfers image data from a first latch 321 to a second latch 322 with a latch signal during a horizontal blank time of a horizontal sync (Hsync) signal. The source driver IC 300 sets a falling time of the source output enable (SOE) signal in the horizontal blank time of the Hsync signal, and thus allows an operation (which applies data voltages to the panel 100) to be started during the horizontal blank time. To this end, the source driver IC 300 includes: an SOE output unit for outputting the SOE signal whose a rising time is generated in a display period of the horizontal sync signal and a falling time is generated in the horizontal blank time of the horizontal sync signal; and a latch signal output unit 350 for outputting the latch signal that allows data to be transferred from the first latch 321 to the second latch 322. The source driver IC 300 for performing the above-described function will be described in detail with reference to FIGS. 4 to 6.

Figure 5:
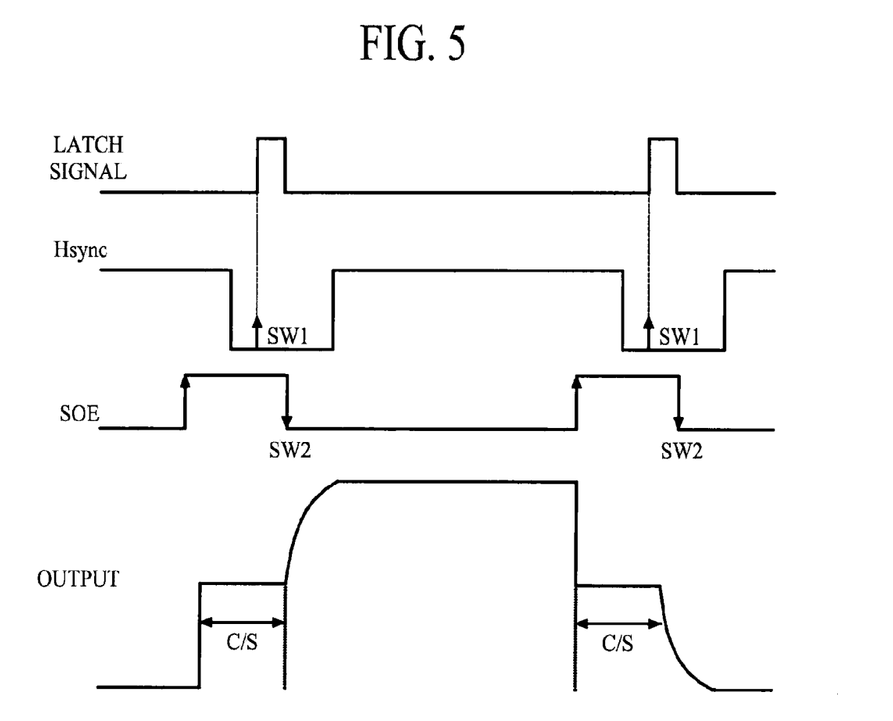
FIG. 5 is an exemplary diagram showing various waveforms that are generated in a source driver IC of the LCD device according to an embodiment of the present invention.
Figure 6A:
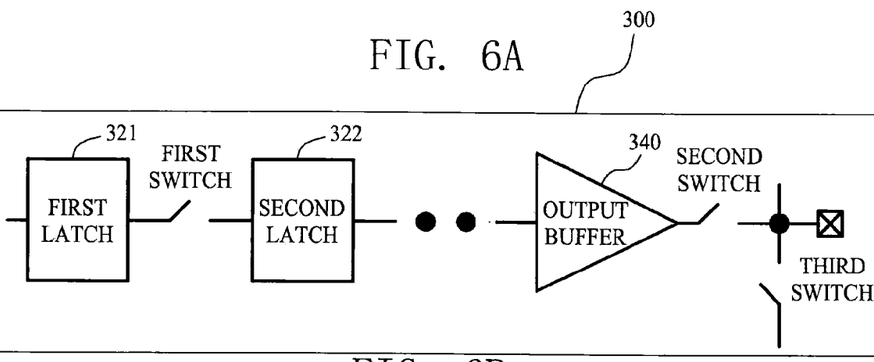
FIGS. 6A and 6B are exemplary diagrams for describing a configuration and operation of the source driver IC according to an embodiment of the present invention.
Figure 6B:
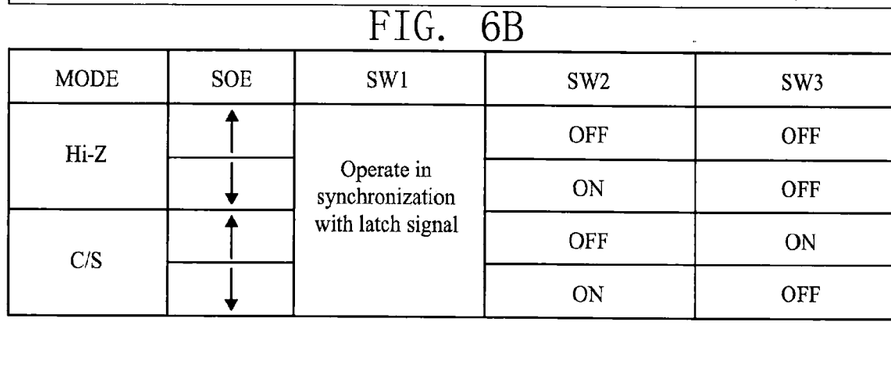
Figure 7:
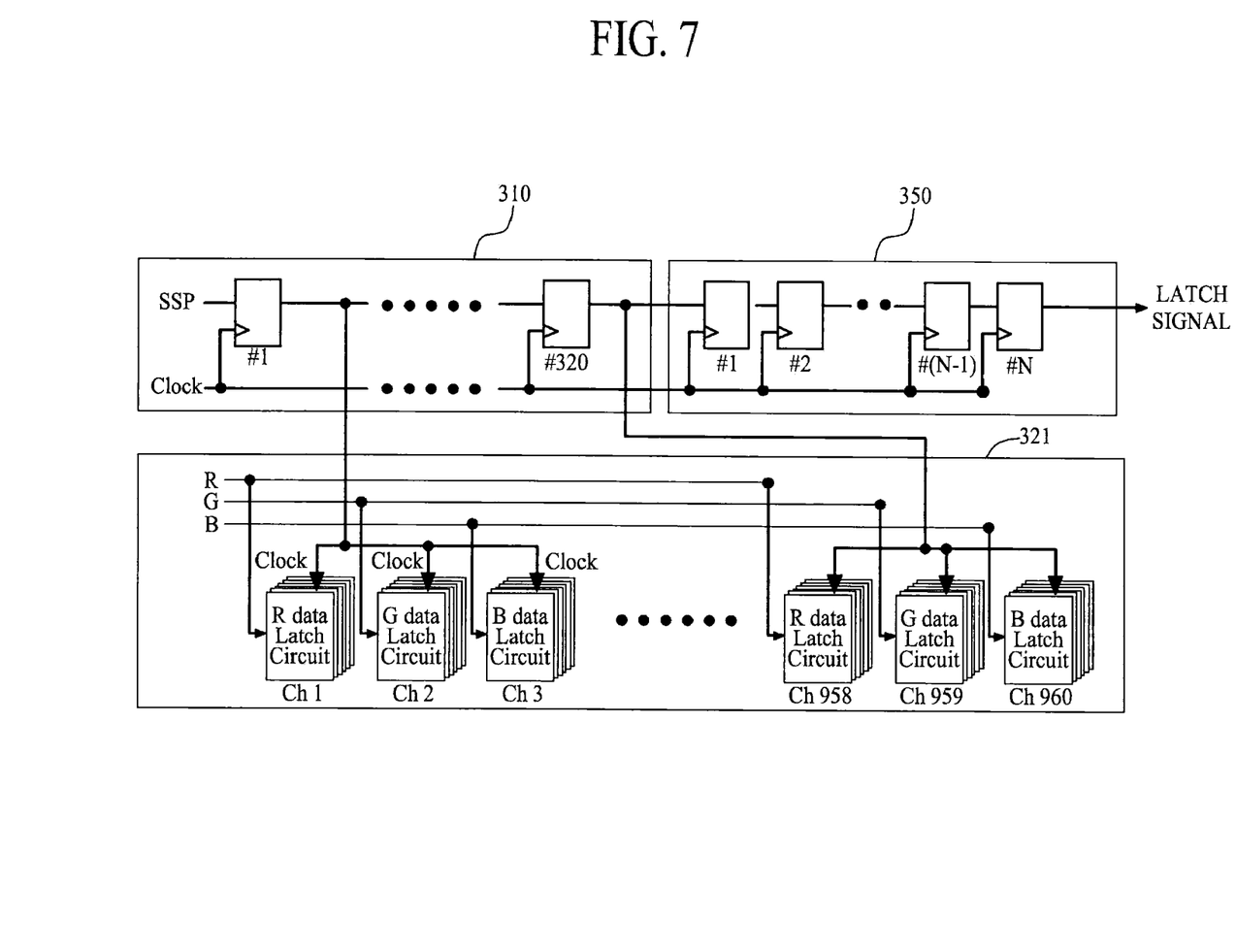
FIG. 7 is an exemplary diagram for describing a method of generating a latch signal in the LCD device according to an embodiment of the present invention.

FIG. 5 is an exemplary diagram showing various waveforms that are generated in a source driver IC of the LCD device according to an embodiment of the present invention. FIGS. 6A and 6B are exemplary diagrams for describing a configuration and operation of the source driver IC according to an embodiment of the present invention. FIG. 6A is an exemplary diagram illustrating connection states between the internal elements of the source driver IC, and FIG. 6A is an exemplary diagram for describing respective switching operations of the elements of FIG. 6A. FIG. 7 is an exemplary diagram for describing a method of generating a latch signal in the LCD device according to an embodiment of the present invention.

The source driver IC 300, as described above, converts digital image data transferred from the timing controller 400 into analog data voltages and outputs the data voltages to the panel 100.

Before describing in detail the configuration of the source driver IC 300, FIG. 6B will be described as follows. In FIG. 6B, a C/S mode uses a charge share voltage. In the C/S mode, when a third switch SW3 is turned on at a rising time of the SOE signal, the panel 100 is charged with the charge share voltage C/S until a falling time of the SOE signal, and, after the falling time of the SOE signal, data voltages are outputted. The charge share voltage C/S may have a voltage value corresponding to half of each of the data voltages.

Here, the charge share voltage C/S is not a voltage that is substantially applied to the panel 100, and is a voltage that is generated by sharing of a positive electric charge and a negative electric charge in the panel 100. A charge share function, which is performed by a charge share unit 380 to be described below, does not applies a special voltage to the panel 100, but, by turning on the third switch SW3 that shares a positive electric charge and a negative electric charge in the panel 100, the charge share function allows the charge share voltage C/S to be generated in the panel 100 (hereinafter the same).

Before outputting data voltages to the panel 100, by boosting the voltage in the panel 100 by the charge share voltage C/S, a data voltage can be quickly boosted to a corresponding level. Therefore, a delay time until an image is outputted can be shortened. In FIG. 6B, an Hi-Z mode does not use the charge share voltage. In the Hi-Z mode, as shown in FIG. 6B, the third switch SW3 always maintains a turn-off state. Accordingly, a data voltage is outputted from a reference voltage at the falling time of the SOE signal.

The present invention may use the charge share voltage C/S, or may not use the charge share voltage C/S. Hereinafter, a case using the charge share voltage C/S will be described as an example of the present invention.

The source driver IC 300, as illustrated in FIG. 4, includes: a reception unit 370 that communicates with the timing controller 400 to receive image data and a plurality of control signals; a sampling unit 310 that converts the image data, received through the reception unit 370, into parallel data by using the first and second latches 321 and 322; a digital-to-analog converter (DAC) 330 that converts R, G, and B image data from the sampling unit 310 into analog data voltages; an output buffer 340 that buffers the R, G, and B data voltages from the DAC 330 and outputs the buffered data voltages; an SOE output unit 360 that outputs the SOE signal, whose a rising times occurs in the display period of the Hsync signal and a falling time occurs in the horizontal blank time of the Hsync signal, on the basis of information received through the reception unit 370; a latch signal output unit 350 that outputs the latch signal, allowing image data to be transferred from the first latch 321 to the second latch 322 of the sampling unit 310, with the information received through the reception unit 370; a charge share unit 380 that allows the charge share voltage to be generated in the panel 100 at the rising time of the SOE signal. The LCD device may include k number source driver ICs having the configuration of FIG. 4. Each of the k source driver ICs drives the data lines DL by m/k number. That is, when the total number of data lines DL is m number and the number of source driver ICs 300 is k number, each source driver IC 300 supplies data voltages to m/k number of data lines DL. The LCD device, as described above, includes at least one or more source driver IC 300. However, in FIG. 5 and hereinafter, for convenience of a description, a case including one source driver IC 300 will be described as an example of the present invention.

The reception unit 370 communicates with the timing controller 400 to receive image data and various control signals from the timing controller 400. When the timing controller 400 and the source driver IC 300 use an interface such as a mini-LVDS interface, the reception unit 370 receives various data signals DCS and image data RGB from the timing controller 400. When the timing controller 400 and the source driver IC 300 use the EPI having an embedded clock type, the reception unit 370 may receive a preamble signal, a source control data packet, a clock signal, and an image data (RGB) packet.

The sampling unit 310 converts the image data, received through the reception unit 370, into parallel data by using the first and second latches 321 and 322. The sampling unit 310 includes a shift register unit 311 that generates a sampling signal with signals received through the reception unit 370, and a latch unit 323 that includes the first and second latches 312 for latching image data to simultaneously output the latched image data to the DAC 330.

A plurality of shift registers included in the shift register unit 311 may sequentially shift a source start pulse (SSP), received through the reception unit 370, to output the sampling signal according to a source sampling clock (SSC) signal.

The latch unit 323 sequentially samples and latches image data (which are received through the reception unit 370) in certain units in response to the sampling signal transferred from the shift register unit 311.

Especially, the latch unit 323 includes the first latch 321 that sequentially latches image data in response to the sampling signal sequentially inputted from the shift register unit 311 and simultaneously outputs the latched image data, and the second latch 322 that latches the image data inputted from the first latch 321 and simultaneously outputs the image data to the DAC 330 during a low logic period after the falling time of the SOE signal.

Here, the first latch 321 simultaneously outputs latched image data to the second latch 322 according to the latch signal transferred from the latch signal output unit 350.

Moreover, as described above, the second latch 322 simultaneously outputs latched image data to the DAC 330 at the falling time of the SOE signal. For example, when the LCD device includes k number of source driver ICs, both the second latch 322 included in each of the source driver ICs and the second latches 322 respectively included in the other source driver ICs simultaneously output latched image data to the DAC 330 during the low logic period after the falling time of the source output enable (SOE) signal.

The DAC 330 simultaneously converts image data, transferred from the latch unit 323 of the sampling unit 310, into positive or negative data voltages and outputs the data voltages. To this end, the DAC 330 includes a positive (P) decoder 331 and a negative (N) decoder 332 that are in common connected to the latch unit 323, and a multiplexer (MUX) 333 that selects one of the output signals of the P decoder 331 and N decoder 332 according to a polarity control signal POL received through the reception unit 370. Here, the P decoder 331 and the N decoder 332 converts image data, simultaneously inputted from the latch unit 323, into positive or negative data voltages with positive or negative gamma reference voltages transferred from the gamma reference voltage generator 600.

The output buffer 340 outputs the positive or negative data voltages, transferred from the DAC 330, to the data lines DL of the panel 100 in response to the falling time of the SOE signal transferred from the SOE output unit 360. Also, when the source driver IC 300 includes the charge share unit 380, the output buffer 340 may allow the charge share voltage to be generated in the panel 100 in response to the rising time of the SOE signal.

The latch signal output unit 350, as described above and shown in FIGS. 5 and 6, outputs the latch signal. That is, when a first switch SW1 included in the first latch 321 is turned on in synchronization with the latch signal, the first latch 321 simultaneously outputs latched image data to the second latch 322.

The latch signal may be generated by various schemes, and outputted through the latch signal output unit 350.

In a first scheme, the latch signal may be generated to have a timing and a pulse width of FIG. 5 by the timing controller 400, received by the reception unit 370 of the source driver IC 300, and outputted through the latch signal output unit 350. That is, the timing controller 400 may include a control signal generator that generates the data control signal DCS for controlling the source driver IC 300 and a data aligner that aligns video data inputted from the external system to transfer image data to the source driver IC 300, in which case the latch signal may be generated by the control signal generator and transferred to the source driver IC 300, together with the other data control signals. Here, as shown in FIG. 5, the latch signal is generated such that the latch signal is outputted at a time earlier than the falling time of the SOE signal, during the blank time of the horizontal synch signal Hsync.

In a second scheme, the latch signal output unit 350 may generate and output the latch signal with a control signal or a clock received through the reception unit 370. That is, the latch signal output unit 350 may generate the latch signal having a waveform of FIG. 5 with one of data control signals received through the reception unit 370 or with the clock received through the reception unit 370. For example, the latch signal output unit 350 includes a delayer or a register, and, by delaying the source start pulse SSP received through the reception unit 370, the latch signal output unit 350 may generate the latch signal having the waveform of FIG. 5. Also, the latch signal output unit 350 may delay the clock received through the reception unit 370 so as to have the waveform of FIG. 5, thereby generating the latch signal.

In a third scheme, as illustrated in FIG. 7, the latch signal output unit 350 including a plurality of registers delays a signal outputted from the last shift register of the shift register unit 311 to generate the latch signal by using a register. For example, when the LCD device uses a panel in which the number of data lines (number of channels) is 960, the shift register unit 311 may be configured with 320 shift registers, the first latch 321 sequentially latches image data according to the sampling signal that is sequentially outputted and the respective shift registers are sequentially driven with the source start pulse (SSP) and the clock. Therefore, when the sampling signal is received from the last shift register #320, the first latch 321 latches all image data. The latch signal output unit 350 receiving the sampling signal from the last shift register #320, as shown in FIG. 5, delays the sampling signal and outputs the delayed sampling signal to the first latch 321, such that the first switch SW1 is turned on during the blank time of the horizontal sync signal. Here, the output timing of the latch signal may be controlled with the number of registers included in the latch signal output unit 350. The latch signal outputted from the latch signal output unit 350, as described above, turns on the first switch SW1 and thus allows image data, latched by the first latch 321, to simultaneously be outputted to the second latch 322. For example, when the number of source driver ICs 300 is k number, k number of shift register units 311 are provided, and each of the k shift register units 311 includes 320/k number of shift registers. Also, the sampling signal outputted from the latch signal output unit 350 is a signal that is outputted from the last shift register included in the shift register unit 311 of the source driver IC 300.

In addition to the above-described three schemes, the latch signal may be generated by various schemes, and turn on the first switch SW1 at a timing of FIG. 5.

The SOE output unit 360 outputs the SOE signal for controlling the output buffer 330. The SOE signal, as described above, is a control signal that allows data voltages, outputted from the DAC 330, to be outputted to the panel 100 through the output buffer 340. As shown in FIG. 5, a second switch SW2 of the output buffer 330 is turned on according to the falling signal of the SOE signal, and thus, the data voltages are outputted to the panel 100 through output buffer 330.

The falling time of the SOE signal may occur after the first switch SW1 is turned on with the latch signal, during the blank time of the Hsync signal.

The rising time of the SOE signal may be set in a display period immediately before the blank time in which the falling time of the SOE signal is set. Here, the rising time of the SOE signal is required to be set in a display period immediately before the rising time, and particularly, a period in which a data voltage is not outputted.

The rising time of the SOE signal may occur before the first switch SW1 is turned on, during the blank time of the Hsync signal. However, when the charge share unit 380 is included in the source driver IC 300, in consideration of a time for which the charge share voltage C/S is charged into the panel 100, as described above, the rising time of the SOE signal may be set in a latter portion of a display period immediately before a blank time in which the falling time of the SOE signal is set.

The SOE signal may be generated by various schemes, and outputted through the SOE output unit 360.

In a first scheme, the SOE signal may be generated to have a timing and a pulse width of FIG. 5 by the timing controller 400, received by the reception unit 370 of the source driver IC 300, and outputted through the SOE output unit 360. That is, the control signal generator of the timing controller 400 may generate the SOE signal having the timing and pulse width of FIG. 5 together with the various gate control signals (GCS) and data controls signals (DCS), and transfer the SOE signal to the source driver IC 300. The SOE output unit 360 may receive the SOE signal through the reception unit 370 and output the SOE signal.

In a second scheme, the SOE output unit 360 may receive a SOE signal having a conventional time and a pulse width of FIG. 2 through the reception unit 370, and shift the received SOE signal to generate a SOE signal having the timing and pulse width of FIG. 5. That is, as shown in FIG. 2, the timing controller 400 may generate a conventional SOE signal whose rising time is set in the blank time of the horizontal sync signal and a falling time is set in the display period of the horizontal sync signal, and transfer the conventional SOE signal to the source driver IC 300. The SOE output unit 360 included in the source driver IC 300 may shift the conventional SOE signal received through the reception unit 370 to generate the SOE signal of FIG. 5.

That is, the SOE output unit 360 may receive the SOE signal that is generated and transferred to have the timing and pulse width of FIG. 5 by the timing controller 400, and output the SOE signal as-is. Alternatively, the SOE output unit 360 may convert the conventional SOE signal, generated and transferred by the timing controller 400, into a SOE signal having the timing and pulse width of FIG. 5, and output the converted SOE signal.

In addition to the above-described two schemes, the SOE signal may be generated by various schemes, and then, as shown in FIGS. 5 and 6, the SOE signal may rise or fall and thus turn on the third switch SW3 or the second switch SW2, thereby allowing the charge share voltage C/S to be generated in the panel 100 or allowing data voltages to be applied to the panel 100.

The present invention may be applied to all LCD devices irrespective of the kind of an interface between the timing controller 400 and the source driver IC 300. That is, the present invention may be applied to LCD devices in which the third switch SW3 is turned on in synchronization with the rising time of the SOE signal, the second switch SW2 is turned on in synchronization with the falling time of the SOE signal, the falling time of the SOE signal is included in the display period of the Hsync signal, and the first switch SW1 is turned on with the latch signal (which is outputted in the blank time of the Hsync signal) to allow image data to be transferred from the first latch 321 to the second latch 322.

However, as described above in the related art, the source driver IC 300 using the EPI driven with a low voltage may be greatly affected by a power ripple. Hereinafter, therefore, the LCD device according to the present invention will be described in detail with the source driver IC 300 using the EPI as an example. In the below description, the LCD device according to the present invention that will be described below with reference to FIGS. 8 to 10 corresponds to a special case of the present invention that has been described above with reference to FIGS. 4 to 7, and uses the EPI as in interface between the timing controller 400 and the source driver IC 300. Thus, in the below description, description identical or similar to the description of FIGS. 4 to 7 is simply made or is not provided.

Figure 8:
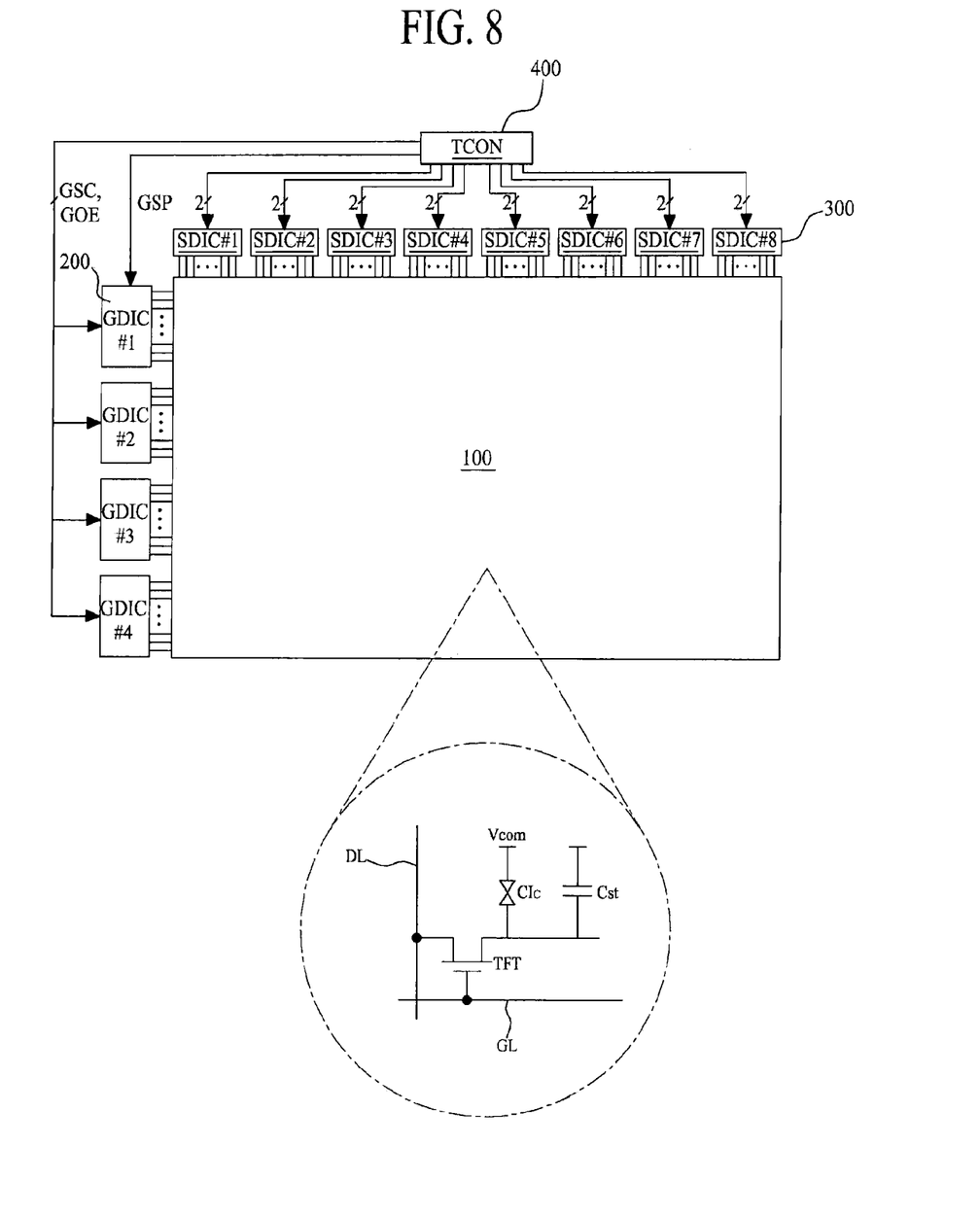
FIG. 8 is an exemplary diagram illustrating a configuration of an LCD device using an EPI according to an embodiment of the present invention.

FIG. 8 is an exemplary diagram illustrating a configuration of an LCD device using an EPI according to an embodiment of the present invention.

The LCD device using the EPI according to the present invention includes the panel 100, the timing controller 400, eight source driver ICs (SDIC#1 to SDIC#8) 300, and four gate driver ICs (GDIC#1 to GDIC#4) 200. That is, the LCD device of FIG. 8 includes the eight source driver ICs (SDIC#1 to SDIC#8) 300, each of which includes the elements of the source driver IC 300 of FIG. 4.

The configuration and function of each of the panel 100 and the gate driver IC 200 are the same as those of each of the panel 100 and the gate driver IC 200 that have been described above with reference to FIG. 4, and thus, their detailed description is not provided.

The timing controller 400 receives an external timing signal including the vertical sync (Vsync) signal, the horizontal sync (Hsync) signal, an external data enable (DE) signal, and a dot clock CLK through an interface such as an LVDS interface or a transition minimized differential signaling (TMDS) interface, and generates control signals for controlling the operation timing of each of the source driver ICs (SDIC#1 to SDIC#8) 300 and the gate driver ICs (GDIC#1 to GDIC#4) 200.

Especially, the timing controller 400 is connected to the source driver ICs (SDIC#1 to SDIC#8) 300 in the EPI type. The timing controller 400 transfers a source control data packet including a data control signal and a preamble signal for initializing the source driver ICs (SDIC#1 to SDIC#8) 300, a clock, and an image data packet to the source driver ICs (SDIC#1 to SDIC#8) 300 through one data line pair.

The gate control signal GCS generated by the control signal generator of the timing controller 400 includes a gate start pulse GSP, a gate shift clock GSC, and a gate output enable (GOE) signal.

The data control signal (DCS) generated by the control signal generator of the timing controller 400 is transferred to the source driver ICs (SDIC#1 to SDIC#8) 300 through a data line pair during an interval between a time (at which the preamble signal is transferred) and a time at which the image data packet is transferred. The DCS signal includes polarity control-related control data, and source output-related control data.

The polarity control-related control data includes control information for controlling the polarity control signal POL having a pulse type which is generated by the source driver ICs (SDIC#1 to SDIC#8). The source output-related control data includes control information for generating, restoring, or controlling the SOE signal having a pulse type which is generated by the source driver ICs.

The source driver ICs (SDIC#1 to SDIC#8) 300 lock an output frequency and an output phase according to the preamble signal that is supplied from the timing controller 400 through the data line pair. After the output frequency and the output phase are locked, the source driver ICs (SDIC#1 to SDIC#8) 300 restore a serial clock from the image data packet that is inputted as a digital bit stream through the data line pair. The source driver ICs (SDIC#1 to SDIC#8) 300 output the polarity control signal POL and the SOE signal with a source control data packet. The source driver ICs (SDIC#1 to SDIC#8) 300 restore a clock from the image data packet, inputted through the data line pair, to generate the serial clock for sampling data, and sample image data that are serially inputted according to the serial clock. The source driver ICs (SDIC#1 to SDIC#8) 300 convert the sequentially sampled image data into a parallel type, convert the image data into positive/negative data voltages in response to the polarity control signal POL, and supplies the converted data voltages to the data lines DL in response to the SOE signal.

The SOE signal outputted from each of the source driver ICs (SDIC#1 to SDIC#8) 300 has the timing and pulse width of FIG. 5, and, as described above with reference to FIGS. 4 to 7, the SOE signal falls in the blank time of the Hsync signal. At this point, data voltages are applied to the panel 100 at the falling time of the SOE signal.

Moreover, as described above with reference to FIGS. 4 to 7, each of the source driver ICs 300 simultaneously outputs image data from the first latch 321 to the second latch 322 according to the latch signal outputted from the latch signal output unit 350.

Figure 9:
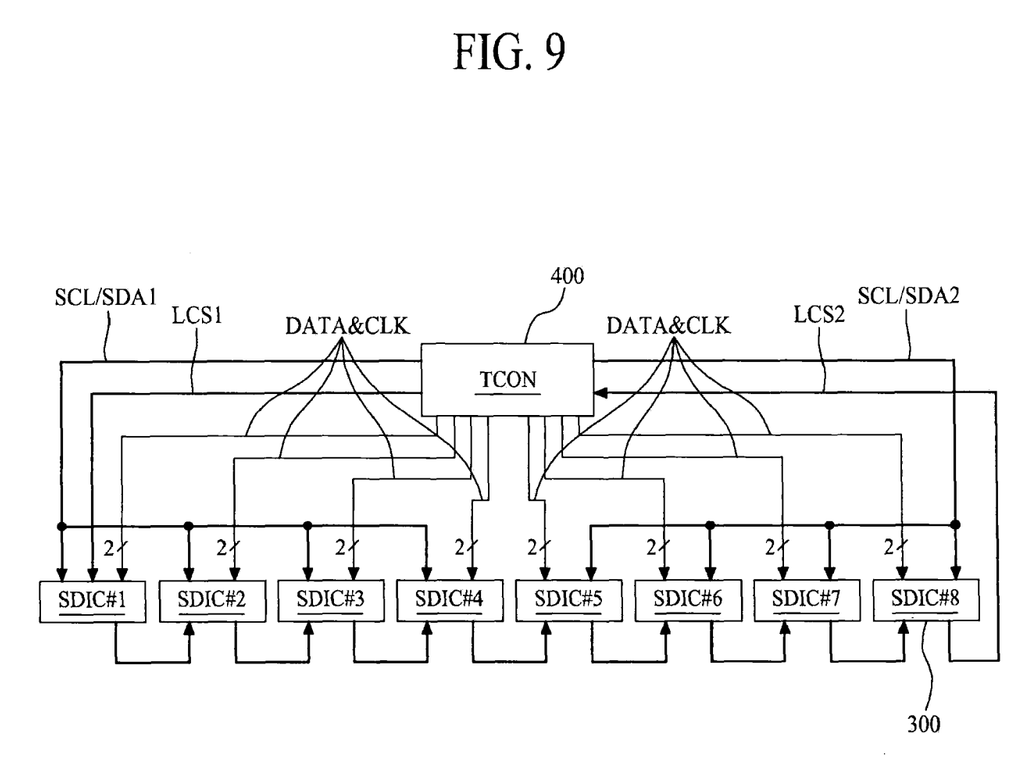
FIG. 9 is an exemplary diagram for describing the EPI corresponding to an interface type between a timing controller and a source driver IC in the LCD device of FIG. 8.

FIG. 9 is an exemplary diagram for describing the EPI corresponding to an interface type between the timing controller 400 and the source driver IC 300 in the LCD device of FIG. 8. The EPI having an interface type between the timing controller 400 and the source driver ICs (SDIC#1 to SDIC#8) 300 will now be described in detail.

As illustrated in FIG. 9, lines such as a data line pair DATA&CLK, a control line pair SCL/SDA, and a lock check line LCS are formed between the timing controller 400 and the source driver ICs (SDIC#1 to SDIC#8) 300.

The timing controller 400 sequentially transfers the preamble signal, the source control data packet, and the image data packet to the source driver ICs (SDIC#1 to SDIC#8) 300 through the data line pair DATA&CLK. The source control data packet is a bit stream including a clock bit, a polarity control-related control data bit, a source output-related control data bit. The image data packet is a bit stream including a clock bit, an internal data enable bit, and an image data bit. The data line pair DATA&CLK serially connects the timing controller 400 to the source driver ICs (SDIC#1 to SDIC#8) 300 in a 1:1 type, namely, a point-to-point type. Each of the source driver ICs (SDIC#1 to SDIC#8) 300 restores clocks inputted through the data line pair DATA&CLK. Accordingly, a line for transferring a clock carry and image data between adjacent source driver ICs 300 is not required.

The timing controller 400 transfers a chip identification code (CID) of each of the source driver ICs (SDIC#1 to SDIC#8) 300 and chip individual control data for controlling the function of each of the source driver ICs (SDIC#1 to SDIC#8) 300, to the source driver ICs (SDIC#1 to SDIC#8) 300 through the control line pair SCL/SDA. The control line pair SCL/SDA is in common connected between the timing controller 400 and the source driver ICs 300. When the source driver ICs 300 are divided into two groups and connected to two source PCBs, a first control line pair SCL/SDA1 is parallelly connected between the timing controller 400 and the first to fourth source driver ICs (SDIC#1 to SDIC#4) 300, and a second control line pair SCL/SDA2 is parallely connected between the timing controller 400 and the fifth to eighth source driver ICs (SDIC#5 to SDIC#8) 300.

The timing controller 400 supplies a lock signal LOCK, which is used for checking whether outputs of the source driver ICs (SDIC#1 to SDIC#8) 300 are stably locked, to the first source driver IC (SDIC#1) 300 through a lock check line LCS1. The source driver ICs (SDIC#1 to SDIC#8) 300 are connected in cascade through a line for transferring the lock signal LOCK. When the frequency and phase of an output clock for sampling data are locked, the first source driver IC (SDIC#1) 300 transfers a high-level lock signal to the second source driver IC (SDIC#2) 300. The second source driver IC (SDIC#2) 300 locks the frequency and phase of the output clock, and then transfers the high-level lock signal to the third source driver IC (SDIC#3) 300. In this way, when the frequency and phase of the output clock of each of the source driver ICs (SDIC#1 to SDIC#8) 300 are locked and then the frequency and phase of the output clock of the last source driver IC (SDIC#8) 300 are locked, the last source driver IC (SDIC#8) 300 feeds back the high-level lock signal to the timing controller 400 through a feedback lock check line LCS2. The timing controller 400 receives the fed-back lock signal, and transfers the source control data packet and the image data packet to the source driver ICs (SDIC#1 to SDIC#8) 300.

A method of driving the LCD device, having the configuration that has been described above with reference to with reference to FIGS. 8 and 9, according to the present invention will now be described.

When power is applied to the LCD device, the timing controller 400 supplies reference signals to the source driver ICs (SDIC#1 to SDIC#8) 300 through the data line pair DATA&CLK, respectively. Each of the reference signals includes a low-frequency preamble signal, and the lock signal supplied to the first source driver IC (SDIC#1) 300. The first source driver IC (SDIC#1) 300 restores the preamble signal to a phase locked loop (PLL) reference clock, and, when the output phase of the PLL reference clock and the phase of a PLL output are locked, the first source driver IC (SDIC#1) 300 transfers the high-level lock signal to the second source driver IC (SDIC#2) 300. Subsequently, when the outputs of the second to eighth source driver ICs (SDIC#2 to SDIC#8) 300 are sequentially locked stably, the eighth source driver IC (SDIC#8) 300 feeds back the high-level lock signal to the timing controller 400. That is, the source driver IC 300 locks the phase and frequency of an output according to the preamble signal that is inputted at a low frequency from the timing controller 400 through the data line pair DATA&CLK, thereby preparing to output image data.

Subsequently, the source driver IC 300 restores a reference clock from the source control data packet that is inputted as a bit stream from the timing controller 400 through the data line pair DATA&CLK, separates the polarity control-related control data from the source control data packet, and restores the polarity control signal POL on the basis of the polarity control-related control data. Also, the source driver IC 300 separates the source output-related control data from the source control data packet, and restores the SOE signal on the basis of source output-related data.

Subsequently, the source driver IC 300 separates a clock from the image data packet, inputted through the data line pair DATA&CLK, to restore the reference clock, and generates serial clock signals for respectively sampling image data bits according to the restored reference clock. To this end, the source diver IC 300 includes a PLL and/or a delay locked loop (DLL) that enable(s) a clock to be outputted at a stable phase and frequency.

Subsequently, the source driver IC 300 samples image data bits (which are serially inputted through the data line pair DATA&CLK) according to the serial clock, latches the sampled image data by using the first latch 321, simultaneously outputs the latched image data to the second latch 322 according to the latch signal outputted from the latch signal output unit 350, and converts a serial transfer data format into a parallel transfer data format. The latch signal, as described above with reference to FIGS. 4 to 7, is generated by various schemes and outputted through the latch signal output unit 350.

Subsequently, the source driver IC 300 converts the image data, latched by the second latch 322, into positive/negative data voltages and outputs the positive/negative data voltages, at the same time.

Finally, the source driver IC 300 outputs the positive/negative data voltages to the data lines of the panel 100 in response to the falling time of the SOE signal transferred from the SOE output unit 360. Also, when the charge share unit 380 is included in the source driver IC 300, the source driver IC 300 allows the charge share voltage to be generated in the panel 100 in response to the rising time of the SOE signal. Here, the output of the data voltages is performed by the output buffer 340.

Among the above-described operations, an operation that converts image data into positive/negative data voltages and output the data voltages at the same time is performed by the DAC 330, an operation that outputs the data voltages to the panel 100 is performed by the output buffer 340, and the other operations are respectively performed by the reception unit 370, the latch signal output unit 350, the SOE output unit 360, and the sampling unit 310. As described above, the configuration and function of each of the reception unit 370, the latch signal output unit 350, the SOE output unit 360, and the sampling unit 310 may be changed in various manner.

Hereinafter, an example of the source driver IC 300 (including the reception unit 370, the latch signal output unit 350, the SOE output unit 360, the sampling unit 310, the DAC 330, and the output buffer 340) of FIGS. 8 and 9 will be described with reference to FIG. 10.

Figure 10:
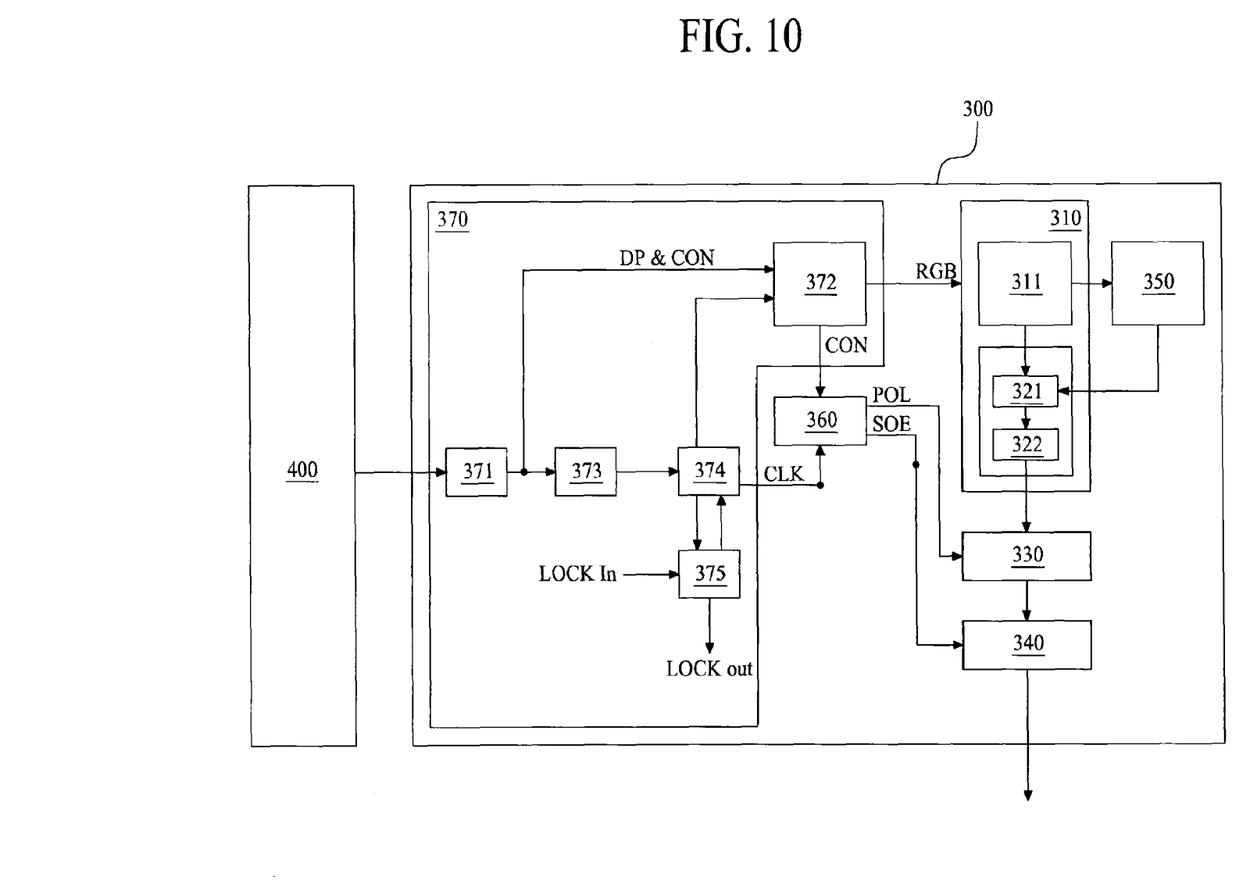
FIG. 10 is an exemplary diagram illustrating a configuration of the source driver IC of FIG. 8.

FIG. 10 is an exemplary diagram illustrating a configuration of the source driver IC 300 of FIG. 8.

The source driver IC 300 applied to the present invention, as described above, includes a reception unit 370, a sampling unit 310, a DAC 330, an output buffer 340, an SOE output unit 360, a latch signal output unit 350, and a charge share unit (not shown).

The reception unit 370 receives various information in communication with the timing controller 400. The reception unit 370 includes: a receiver 371 that receives a source control data packet CON and an image data packet DP from the timing controller 400; a packet separator 372 that separates the source control data packet CON and the image data packet DP from among the packets transferred from the receiver 371, and extracts image data RGB from the image data packet DP to transfer the extracted image data RGB to the sampling unit 310; a clock separator 373 that separates a clock bit from among the packets transferred from the receiver 371; an internal clock generator 374 that generates an internal clock with the clock bit transferred from the clock separator 373; and a lock checker 375 that analyzes the phase and frequency of the internal clock outputted from the internal clock generator 374, and outputs a lock signal.

The receiver 371 receives the image data packet DP and the source control data packet CON, transferred in a serial format, through a data line pair connected to the timing controller 400.

The packet separator 372 separates the source control data packet CON and the image data packet DP from among the packets transferred from the receiver 371, samples the image data packet DP according to the internal clock transferred from the internal clock generator 374, separates the image data RGB from the image data packet DP, transfers the separated image data RGB to the sampling unit 310, and transfers the separated source control data packet CON to the SOE output unit 360.

The clock separator 373 samples the clock bit among the packets received through the receiver 371, and transfers the sampled clock bit to the internal clock generator 374.

The internal clock generator 374 receives the clock bit from the clock separator 373 to generate an internal clock divided by N times a clock bit frequency. The internal clock generated from the internal clock generator 374 is transferred to the packet separator 372 and the SOE output unit 360.

The lock checker 375 analyzes the phase and frequency of the internal clock outputted from the internal clock generator 374, and, when the phase and frequency of the internal clock are stably locked, the lock checker 375 output a high-level lock signal to an adjacent source driver IC 300. That is, the lock checker 375 perform a logical AND operation on an input lock signal (which is transferred from the timing controller 400 or the source driver IC disposed at the front end of the timing controller 400) and the output of the internal clock which is generated by the lock checker 375 analyzing a phase and a frequency, and, when all of the two signals have a high level, the lock checker 375 outputs the high-level lock signal. The high-level lock signal is sequentially transferred to the source driver ICs (SDIC#2 to SDIC#8) disposed at a next end, and the last source driver IC (SDIC#8) feeds back the lock signal (LOCK out) to the timing controller 400.

Subsequently, the sampling unit 310 converts the image data, received through the reception unit 370, into parallel data by using first and second latches 321 and 322. The sampling unit 310 includes a shift register unit 311 that generates a sampling signal with signals SSP and SCP received through the reception unit 370 or the SOE output unit 360, and a latch unit 323 that includes the first and second latches 312 for latching image data to simultaneously output the latched image data. The configuration and function of the sampling unit 310 of FIG. 10 is similar to those of the sampling unit of FIGS. 4 to 7, and thus, its detailed description is omitted herein.

The SOE output unit 360 samples the source control data packet inputted from the packet separator 372 to generate the SOE signal according to the internal clock inputted from the internal clock generator 374. The SOE signal has the timing and the pulse width which have been described above with reference to FIGS. 4 to 7. The SOE output unit 360, as described above with reference to FIGS. 4 to 7, may receive the SOE signal having the timing and pulse width of FIG. 5 from the timing controller 400 to simply restore the SOE signal. Alternatively, the SOE output unit 360 may receive the SOE signal having the conventional timing and pulse width from the timing controller 400, and delay and change the received SOE signal to generate the SOE signal having the timing and pulse width of FIG. 5. Also, the SOE output unit 360 may sample the source control data packet inputted from the packet separator 372 to restore the polarity control signal POL according to the internal clock inputted from the internal clock generator 374. However, the polarity control signal POL may be restored by a separate element included in the reception unit 370 through the above-described scheme.

Subsequently, as described above with reference to FIGS. 4 to 7, the latch signal output unit 350 outputs a latch signal. The latch signal turns on a first switch SW1 of the sampling unit 310, and thus allows image data to be simultaneously transferred from the first latch 321 to the second latch 322 of the sampling unit 310. The latch signal output unit 350, as described above, may output the latch signal through various schemes. Especially, in FIG. 10, the latch signal output unit 350 using the above-described third scheme is illustrated. That is, the latch signal output unit 350 of FIG. 10 may include a plurality of registers, and delay a signal (which is outputted from the last shift register of the shift register unit 311 configuring the sampling unit 310) to generate the latch signal by using a register.

The configuration and function of each of the DAC 330, the output buffer 340, and the charge share unit (not shown) are the same as those of each of the DAC 330, the output buffer 340, and the charge share unit 380 that have been described above with reference to FIGS. 4 to 7, and thus, their detailed description is not provided.

As described above, by changing a timing at which image data are transferred from the first latch 321 to the second latch 322 and a timing at which the image data are applied to the panel 100, the present invention can prevent vertical line noise from being caused by power noise. That is, the present invention can prevent the vertical line noise from being caused by a power ripple between the high-level voltage VDD and the low-level voltage VSS at a time for which the source driver IC 300 charges/discharges the panel load.

To this end, the present invention synchronizes a time, at which image data are transferred from the first latch 321 to the second latch 322 of the source driver IC 300, with a new control signal (i.e., the latch signal) instead of the SOE signal. Also, the present invention sets the falling time of the SOE signal in the blank time instead of the display period of the Hsync signal, and sets the rising time of the SOE signal in an end portion of the display period of the Hsync signal, thereby securing a charge share period.

As described above, the present invention allows data to be transferred from the first latch to the second latch by using the latch signal that is driven independently from the SOE signal allowing data to be outputted to the panel, and thus can prevent vertical line noise caused by the power ripple between the high-level voltage VDD and the low-level voltage VSS.

That is, the present invention can prevent the vertical line noise from occurring due to the power ripple, which is caused because the source driver IC drives the panel load at the SOE falling time, between the high-level voltage VDD and the low-level voltage VSS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display (LCD) device, comprising:
a panel;
one or more gate driver integrated circuit (IC) configured to sequentially drive a plurality of gate lines formed in the panel;
a timing controller configured to control the gate driver IC; and
a source driver IC configured to:
simultaneously transfer image data from a first latch to a second latch responsive to a latch signal turning from a first state to a second state,
convert the image data transferred from the second latch into data voltages, and
output the data voltages to the panel responsive to a source output enable signal turning from a third state to a fourth state in a blank time in a horizontal sync signal, the latch signal turning from the first state to the second state after the source output enable signal turns from the fourth state to the third state and while the source output enable signal remains in the third state.

2. The LCD device of claim 1, wherein,
the source output enable signal turns from the fourth state to the third state in a display period before the blank time of the horizontal sync signal to apply a charge share voltage to the panel, the source output enable signal turns from the fourth state to the third state after the latch signal turns from the first state to the second state.

3. The LCD device of claim 2, further comprising a charge share unit performing a charge share function on the panel to generate the charge share voltage in the panel when the source output enable signal turns from the fourth state to the third state.

4. The LCD device of claim 3, wherein the charge share unit turns on a switch to apply a charge share voltage to the panel.

5. The LCD device of claim 1, wherein the source driver IC comprises:
a reception unit communicating with the timing controller to receive the image data;
a sampling unit converting the image data, received through the reception unit, into parallel data by using the first and second latches;
a digital-to-analog converter (DAC) converting the image data, transferred from the sampling unit, into the data voltages;
an output buffer outputting the data voltages that are transferred from the DAC to the panel;
an SOE output unit outputting the source output enable signal with information received through the reception unit; and
a latch signal output unit outputting the latch signal with the information received through the reception unit.

6. The LCD device of claim 5, wherein,
the latch signal output unit receives the latch signal from the timing controller and outputs the latch signal,
the latch signal output unit causes the latch signal to turn from the first state to the second state responsive to receiving signals from the timing controller, or
the latch signal output unit causes the latch signal to turn from the first state to the second state responsive to receiving signals from the sampling unit.

7. The LCD device of claim 5, wherein the reception unit comprises:
a receiver communicating with the timing controller in an embedded point-to-point interface (EPI) type to receive a source control data packet and an image data packet from the timing controller;

a packet separator separating the source control data packet and the image data packet from among the packets transferred from the receiver, and extracting image data from the image data packet to transfer the extracted image data to the sampling unit;

a clock separator separating a clock bit from among the packets transferred from the receiver; and an internal clock generator generating an internal clock with the clock bit.

8. The LCD device of claim 7, wherein the SOE output unit samples the source control data packet transferred from the packet separator to generate the source output enable signal according to the internal clock.

9. The LCD device of claim 7, wherein the latch signal output unit delays a signal, outputted from a last shift register of a shift register unit configuring the sampling unit, to generate the latch signal by using a register.

10. A method of driving a liquid crystal display (LCD) device, the method comprising:

turning a latch signal from a first state to a second state during a blank time of a horizontal sync signal to simultaneously transfer image data from a first latch to a second latch;

converting the image data that is transferred from the second latch into data voltages; and turning a source output enable signal from a third state to a fourth state in the blank time of the horizontal sync signal after the latch signal turns from the first state to the second state;

outputting the data voltages to a panel responsive to the source output enable signal turning from the third state to the fourth state; and turning the source output enable signal from the fourth state to the third state in a display period before the blank time in the horizontal sync signal.

11. The method of claim 10, further comprising performing a charge share function on the panel when the source output enable signal turns from the third state to the fourth state.

12. The method of claim 11, wherein performing the charge share function comprises turning on a switch to apply a charge share voltage to the panel.

13. The method of claim 12, wherein the source output enable signal turns from the fourth state to the third state to perform the charge share function.

* * * * *